United States Patent
Cho et al.

(10) Patent No.: US 9,970,512 B2
(45) Date of Patent: May 15, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Wonmin Cho, Hwaseong-si (KR); Seong Wook Hwang, Gunpo-si (KR); Hyun Sik Kwon, Seoul (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 15/215,150

(22) Filed: Jul. 20, 2016

(65) Prior Publication Data

US 2017/0261075 A1   Sep. 14, 2017

(30) Foreign Application Priority Data

Mar. 8, 2016   (KR) .................. 10-2016-0027655

(51) Int. Cl.
*F16H 3/66*   (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,683,776 A | * | 8/1987 | Klemen | F16H 3/66 475/286 |
| 8,353,801 B2 | | 1/2013 | Hart et al. | |
| 8,944,949 B2 | | 2/2015 | Mellet et al. | |
| 2006/0270516 A1 | * | 11/2006 | Klemen | F16H 3/66 475/280 |
| 2009/0017971 A1 | * | 1/2009 | Phillips | F16H 3/66 475/276 |
| 2011/0111915 A1 | * | 5/2011 | Hart | F16H 3/66 475/271 |

* cited by examiner

*Primary Examiner* — Ramya P Burgess
*Assistant Examiner* — Timothy Hannon
(74) *Attorney, Agent, or Firm* — Brinks Gilson & Lione

(57) ABSTRACT

Nine or more forward speeds and one or more reverse speed are achieved by a planetary gear train of an automatic transmission for a vehicle. The planetary gear train includes: an input shaft, an output shaft, four planetary gear sets, and six control components. In particular, each of the four planetary gear sets includes a sun gear, a planet carrier, and a ring gear. Selective connections between the sun gears, planet carriers, ring gears, and a transmission housing are performed by the the six control components.

6 Claims, 2 Drawing Sheets

FIG. 2

| Shift-stage | Control element | | | | | | Gear ratio |
|---|---|---|---|---|---|---|---|
| | C1 | C2 | B1 | B2 | B3 | B4 | |
| D1 | | | | ● | | ● | 5.525 |
| D2 | ● | | | | | ● | 3.400 |
| D3 | ● | | | ● | | | 2.509 |
| D4 | ● | | | | ● | | 1.768 |
| D5 | ● | | ● | | | | 1.262 |
| D6 | ● | ● | | | | | 1.000 |
| D7 | | ● | ● | | | | 0.817 |
| D8 | | ● | | | ● | | 0.680 |
| D9 | | ● | | ● | | | 0.605 |
| REV | | | ● | | | ● | -4.067 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0027655, filed on Mar. 8, 2016, which is incorporated herein by reference in its entirety.

FIELD

The present disclosure relates to an automatic transmission for a vehicle.

BACKGROUND

The statements in this section merely provide background information related to the present disclosure and may not constitute prior art.

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate install-ability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

SUMMARY

The present disclosure provides a planetary gear train of an automatic transmission for a vehicle having advantages of obtaining shift-stages of at least nine forward speeds and at least one reverse speed by minimal number of parts, improving power delivery performance and fuel consumption by multi-stages of an automatic transmission, and improving driving stability of a vehicle by utilizing a low rotation speed of an engine.

A planetary gear train according to one form of the present disclosure includes: an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected with the first rotational element; a second shaft interconnecting the second rotational element and the fifth rotational element; a third shaft interconnecting the third rotational element and the fourth rotational element and directly connected with the input shaft; a fourth shaft interconnecting the sixth rotational element and the ninth rotational element; a fifth shaft connecting the seventh rotational element and the tenth rotational element, and selectively connected with the third shaft; a sixth shaft connecting the eighth rotational element and the twelfth rotational element, and selectively connected with the third shaft or a transmission housing; and a seventh shaft connected with the eleventh rotational element and directly connected with the output shaft.

The first shaft, the second shaft, and the fourth shaft may be selectively connected with the transmission housing, respectively.

The first, second, and third rotational element of the first planetary gear set may be respectively a first sun gear, a first planet carrier, and a first ring gear of the first planetary gear set. The fourth, fifth, and sixth rotational element of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to another form of the present disclosure may further include: a first clutch selectively connecting the third shaft and the fifth shaft; a second clutch selectively connecting the third shaft and the sixth shaft; a first brake selectively connecting the first shaft and the transmission housing; a second brake selectively connecting the second shaft and the transmission housing; a third brake selectively connecting the fourth shaft and the transmission housing; and a fourth brake selectively connecting the sixth shaft and the transmission housing.

According to another form of the present disclosure, shift-stages of at least nine forward speeds and at least one reverse speed may be realized by combination of four planetary gear sets of simple planetary gear sets and six control elements.

In addition, a planetary gear train according to the present disclosure may substantially improve driving stability by realizing shift-stages appropriate for rotation speed of an engine due to multi-stages of an automatic transmission.

In addition, a planetary gear train according to the present disclosure may increase engine driving efficiency by multi-stages of an automatic transmission, and may improve power delivery performance and fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective control elements at respective shift-stages in a planetary gear train.

Figure 1:
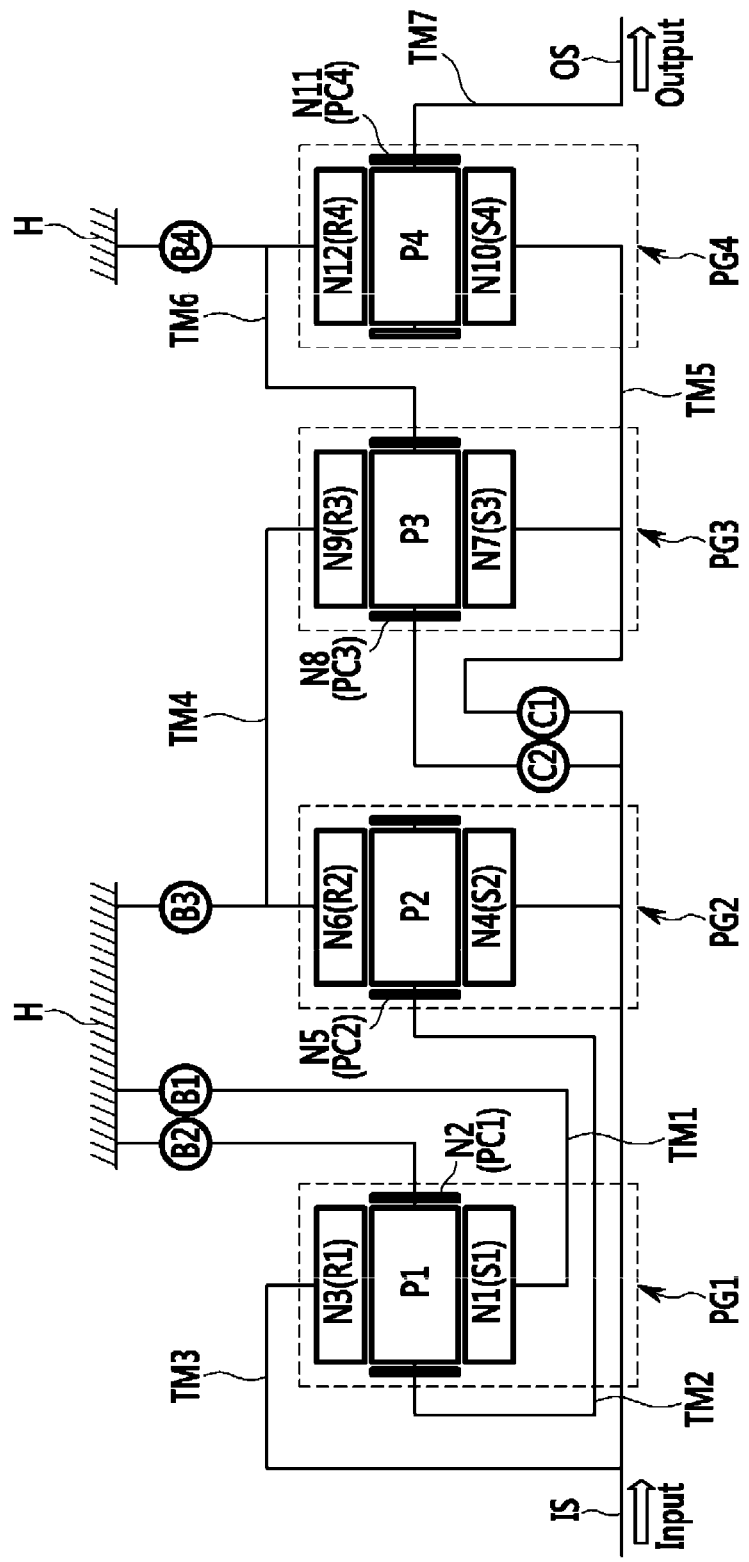
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a schematic diagram of a planetary gear train according to an exemplary form of the present disclosure.

Referring to FIG. 1, a planetary gear train includes first, second, third, and four planetary gear sets PG1, PG2, PG3, and PG4 arranged on a same axis, an input shaft IS, an output shaft OS, seven shafts TM1 to TM7 interconnecting rotational elements of the first, second, third, and four planetary gear sets PG1, PG2, PG3, and PG4, two clutches C1 and C2 and four brakes B1 to B4 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set, and includes a first sun gear S1, a first planet carrier PC1 that supports first pinion gear P1 externally engaged with the first sun gear S1, and a first ring gear R1 that is internally engaged with the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion gear P2 externally engaged with the second sun gear S2, and a second ring gear R2 that is internally engaged with the second pinion gear P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports third pinion gear P3 externally engaged with the third sun gear S3, and a third ring gear R3 that is internally engaged with the third pinion gear P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotational element N10, the fourth planet carrier PC4 acts as a eleventh rotational element N11, and the fourth ring gear R4 acts as a twelfth rotational element N12.

In the arrangement of the first, second, third, and fourth planetary gear sets PG1, PG2, PG3, and PG4, the second rotational element N2 is directly connected with the fifth rotational element N5, the third rotational element N3 is directly connected with the fourth rotational element N4, the sixth rotational element N6 is directly connected with the ninth rotational element N9, and the seventh rotational element N7 is directly connected with the tenth rotational element N10, the eighth rotational element N8 is directly connected with the twelfth rotational element N12, by seven shafts TM1 to TM7.

The seven shafts TM1 to TM7 are arranged as follows.

Each of the seven shafts TM1 to TM7 may be a rotational member that directly interconnects the input and output shafts and rotational elements of the planetary gear sets PG1, PG2, PG3, and PG4, or may be a fixed member fixed to the transmission housing H.

The first shaft TM1 is connected with the first rotational element N1 (first sun gear S1), and selectively connected with the transmission housing H, thereby selectively acting as a fixed element.

The second shaft TM2 directly connects the second rotational element N2 (the first planet carrier PC1) and the fifth rotational element N5 (the second planet carrier PC2), and is selectively connected with the transmission housing H, thereby selectively acting as a fixed element.

The third shaft TM3 directly connects the third rotational element N3 (the first ring gear R1) and the fourth rotational element N4 (the second sun gear S2), and is directly connected with the input shaft IS, thereby always acting as an input element.

The fourth shaft TM4 directly connects the sixth rotational element N6 (the second ring gear R2) and the ninth rotational element N9 (the third ring gear R3), and is selectively connected with the transmission housing H, thereby selectively acting as a fixed element.

The fifth shaft TM5 directly connects the seventh rotational element N7 (the third sun gear S3) and the tenth rotational element N10 (the fourth sun gear S4), and is selectively connected with the third shaft TM3 directly connected with the input shaft IS, thereby selectively acting as an input element.

The sixth shaft TM6 directly connects the eighth rotational element N8 (the third planet carrier PC3) and the twelfth rotational element N12 (the fourth ring gear R4), and is selectively connected with the third shaft TM3 directly connected with the input shaft IS thereby selectively acting as an input element or selectively connected with the transmission housing H thereby selectively acting as a fixed element.

The sixth shaft TM6 and the third shaft TM3 are not simultaneously connected with the transmission housing H.

The seventh shaft TM7 is connected with the eleventh rotational element N11 (fourth planet carrier PC4), and directly connected with the output shaft OS, thereby always acting as an output element.

The seven shafts TM1 to TM7, the input shaft IS, and the output shaft OS may be selectively interconnected with one another by control elements of two clutches C1 and C2.

The seven shafts TM1 to TM7 may be selectively connected with the transmission housing H, by control elements of four brakes B1, B2, B3, and B4.

The two clutches C1 and C2 and the four brakes B1 to B4 are arranged as follows.

The first clutch C1 is arranged between the third shaft TM3 and the fifth shaft TM5, and selectively connects the third shaft TM3 and the fifth shaft TM5, thereby controlling power delivery therebetween.

The second clutch C2 is arranged between the third shaft TM3 and the sixth shaft TM6, and selectively connects the third shaft TM3 and the sixth shaft TM6, thereby controlling power delivery therebetween.

The first brake B1 is arranged between the first shaft TM1 and the transmission housing H, and selectively connects the first shaft TM1 to the transmission housing H.

The second brake B2 is arranged between the second shaft TM2 and the transmission housing H, and selectively connects the second shaft TM2 to the transmission housing H.

The third brake B3 is arranged between the fourth shaft TM4 and the transmission housing H, and selectively connects the fourth shaft TM4 to the transmission housing H.

The fourth brake B4 is arranged between the sixth shaft TM6 and the transmission housing H, and selectively connects the sixth shaft TM6 to the transmission housing H.

The respective control elements of the first and second clutches C1 and C2 and the first, second, third, and fourth brakes B1, B2, B3, and B4 may be realized as multi-plate hydraulic pressure friction devices that are frictionally engaged by hydraulic pressure.

FIG. 2 is an operational chart for respective control elements at respective shift-stages in a planetary gear train according to one form of the present disclosure.

Referring to FIG. 2, a planetary gear train realizes nine forward speeds and one reverse speed by operating two control elements among the first and second clutches C1 and C2 and the first, second, third, and fourth brakes B1, B2, B3, and B4 at respective shift-stages.

In the forward first speed shift-stage D1, the second and fourth brakes B2 and B4 are simultaneously operated.

As a result, torque of the input shaft IS is input to the third shaft TM3, and the second shaft TM2 and the sixth shaft TM6 simultaneously act as fixed elements by the operation of the second and fourth brakes B2 and B4, thereby realizing the forward first speed and outputting a shifted torque to the output shaft OS connected with the seventh shaft TM7.

In the forward second speed shift-stage D2, the first clutch C1 and the fourth brake B4 are simultaneously operated.

As a result, torque of the input shaft IS is input to the third shaft TM3 and simultaneously to the fifth shaft TM5 by the operation of the first clutch C1. In addition, the sixth shaft TM6 acts as a fixed element by the operation of the fourth brake B4, thereby realizing the forward second speed and outputting a shifted torque to the output shaft OS connected with the seventh shaft TM7.

In the forward third speed shift-stage D3, the first clutch C1 and the second brake B2 are simultaneously operated.

As a result, torque of the input shaft IS is input to the third shaft TM3 and simultaneously to the fifth shaft TM5 by the operation of the first clutch C1. In addition, the second TM2 acts as a fixed element by the operation of the second brake B2, thereby realizing the forward third speed and outputting a shifted torque to the output shaft OS connected with the seventh shaft TM7.

In the forward fourth speed shift-stage D4, the first clutch C1 and the third brake B3 are simultaneously operated.

As a result, torque of the input shaft IS is input to the third shaft TM3 and simultaneously to the fifth shaft TM5 by the operation of the first clutch C1. In addition, the fourth shaft TM4 acts as a fixed element by the operation of the third brake B3, thereby realizing the forward fourth speed and outputting a shifted torque to the output shaft OS connected with the seventh shaft TM7.

In the forward fifth speed shift-stage D5, the first clutch C1 and the first brake B1 are simultaneously operated.

As a result, torque of the input shaft IS is input to the third shaft TM3 and simultaneously to the fifth shaft TM5 by the operation of the first clutch C1. In addition, the first shaft TM1 acts as a fixed element by the operation of the first brake B1, thereby realizing the forward fifth speed and outputting a shifted torque to the output shaft OS connected with the seventh shaft TM7.

In the forward sixth speed shift-stage D6, the first and second clutches C1 and C2 are simultaneously operated.

As a result, torque of the input shaft IS is input to the third shaft TM3 and simultaneously to the fifth and sixth shafts TM5 and TM6 by the operation of the first and second clutches C1 and C2. In this case, entire planetary gear sets PG1, PG2, PG3, and PG4 integrally rotate, and a torque is outputted as inputted, thereby forming the forward sixth speed and outputting the inputted torque to the output shaft OS connected with the seventh shaft TM7.

In the forward seventh speed shift-stage D7, the second clutch C2 and the first brake B1 are simultaneously operated.

As a result, torque of the input shaft IS is input to the third shaft TM3 and simultaneously to the sixth shaft TM6 by the operation of the second clutch C2. In addition, the first shaft TM1 acts as a fixed element by the operation of the first brake B1, thereby realizing the forward seventh speed and outputting a shifted torque to the output shaft OS connected with the seventh shaft TM7.

In the forward eighth speed shift-stage D8, the second clutch C2 and the third brake B3 are simultaneously operated. As a result, torque of the input shaft IS is input to the third shaft TM3 and simultaneously to the sixth shaft TM6 by the operation of the second clutch C2. In addition, the fourth shaft TM4 acts as a fixed element by the operation of the third brake B3, thereby realizing the forward eighth speed and outputting a shifted torque to the output shaft OS connected with the seventh shaft TM7.

In the forward ninth speed shift-stage D9, the second clutch C2 and the second brake B2 are simultaneously operated.

As a result, torque of the input shaft IS is input to the third shaft TM3 and simultaneously to the sixth shaft TM6 by the operation of the second clutch C2. In addition, the second shaft TM2 acts as a fixed element by the operation of the second brake B2, thereby realizing the forward ninth speed and outputting a shifted torque to the output shaft OS connected with the seventh shaft TM7.

In the reverse speed REV, the first and fourth brakes B1 and B4 are simultaneously operated.

As a result, torque of the input shaft IS is input to the third shaft TM3, and the first shaft TM1 and the sixth shaft TM6 simultaneously act as fixed elements by the operation of the first and fourth brakes B1 and B4, thereby realizing the reverse speed and outputting a reverse torque to the output shaft OS connected with the seventh shaft TM7.

As described above, a planetary gear train according to one form of the present disclosure may realize at least nine forward speeds and at least one reverse speed by operating four planetary gear sets PG1, PG2, PG3, and PG4 by controlling the two clutches C1 and C2 and the four brakes B1, B2, B3, and B4.

In addition, a planetary gear train according to the present disclosure may realize shift stages appropriate for rotation speed of an engine due to multi-stages of an automatic transmission and improve driving stability of a vehicle by utilizing a low rotation speed of an engine.

In addition, a planetary gear train of the present disclosure increases engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2, B3, B4: first, second, third, and fourth brakes
C1, C2: first and second clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7: first, second, third, fourth, fifth, sixth, and seventh shafts

What is claimed is:

1. A planetary gear train of an automatic transmission for a vehicle, the planetary gear train comprising:
   an input shaft configured to receive an engine torque;
   an output shaft configured to output a shifted torque;
   a first planetary gear set including first, second, and third rotational elements;
   a second planetary gear set including fourth, fifth, and sixth rotational elements;
   a third planetary gear set including seventh, eighth, and ninth rotational elements;
   a fourth planetary gear set including tenth, eleventh, and twelfth rotational elements;
   a first shaft fixedly connected with the first rotational element;
   a second shaft configured to fixedly interconnect the second rotational element and the fifth rotational element;
   a third shaft configured to fixedly interconnect the third rotational element and the fourth rotational element and fixedly connected with the input shaft;
   a fourth shaft configured to fixedly interconnect the sixth rotational element and the ninth rotational element;
   a fifth shaft configured to connect the seventh rotational element and the tenth rotational element, and selectively connected with the third shaft;
   a sixth shaft configured to connect the eighth rotational element and the twelfth rotational element, and selectively connected with the third shaft or a transmission housing; and
   a seventh shaft fixedly connected with the eleventh rotational element and the output shaft,
   wherein
   the first, second, and third rotational elements of the first planetary gear set are respectively a first sun gear, a first planet carrier, and a first ring gear of the first planetary gear set;
   the fourth, fifth, and sixth rotational elements of the second planetary gear set are respectively a second sun gear, a second planet carrier, and a second ring gear of the second planetary gear set;
   the seventh, eighth, and ninth rotational elements of the third planetary gear set are respectively a third sun gear, a third planet carrier, and a third ring gear of the third planetary gear set; and
   the tenth, eleventh, and twelfth rotational elements of the fourth planetary gear set are respectively a fourth sun gear, a fourth planet carrier, and a fourth ring gear of the fourth planetary gear set.

2. The planetary gear train of claim 1, wherein the first shaft, the second shaft, and the fourth shaft are selectively connected with the transmission housing, respectively.

3. The planetary gear train of claim 1, further comprising:
   a first clutch configured to selectively connect the third shaft and the fifth shaft;
   a second clutch configured to selectively connect the third shaft and the sixth shaft;
   a first brake configured to selectively connect the first shaft and the transmission housing;
   a second brake configured to selectively connect the second shaft and the transmission housing;
   a third brake configured to selectively connect the fourth shaft and the transmission housing; and
   a fourth brake configured to selectively connect the sixth shaft and the transmission housing.

4. A planetary gear train of an automatic transmission for a vehicle, the planetary gear train comprising:
   an input shaft configured to receive an engine torque;
   an output shaft configured to output a shifted torque;
   a first planetary gear set including first, second, and third rotational elements;
   a second planetary gear set including fourth, fifth, and sixth rotational elements;
   a third planetary gear set including seventh, eighth, and ninth rotational elements; and
   a fourth planetary gear set including tenth, eleventh, and twelfth rotational elements,
   wherein the input shaft is fixedly connected with the third rotational element and fourth rotational element,
   the output shaft is fixedly connected with the eleventh rotational element,
   the second rotational element is fixedly connected with the fifth rotational element,
   the sixth rotational element is fixedly connected with the ninth rotational element,
   the seventh rotational element is fixedly connected with the tenth rotational element and selectively connected with the fourth rotational element, and
   the eighth rotational element is fixedly connected with the twelfth rotational element and selectively connected with the fourth rotational element or a transmission housing,
   wherein the first, the second, and the third rotational elements of the first planetary gear set are respectively a first sun gear, a first planet carrier, and a first ring gear;

the fourth, fifth, and sixth rotational elements of the second planetary gear set are respectively a second sun gear, a second planet carrier, and a second ring gear of the second planetary gear set;

the seventh, the eighth, and the ninth rotational elements of the third planetary gear set are respectively a third sun gear, a third planet carrier, and a third ring gear of the third planetary gear set; and the tenth, eleventh, and twelfth rotational elements of the fourth planetary gear set are respectively a fourth sun gear, a fourth planet carrier, and a fourth ring gear of the fourth planetary gear set.

5. The planetary gear train of claim 4, wherein the first rotational element, the second rotational element, and the sixth rotational element are selectively connected with the transmission housing, respectively.

6. The planetary gear train of claim 5, further comprising:

a first clutch configured to selectively connect the fourth rotational element and the seventh rotational element;

a second clutch configured to selectively connect the fourth rotational element and the eighth rotational element;

a first brake configured to selectively connect the first rotational element and the transmission housing;

a second brake configured to selectively connect the second rotational element and the transmission housing;

a third brake configured to selectively connect the sixth rotational element and the transmission housing; and a fourth brake configured to selectively connect the twelfth rotational element and the transmission housing.

* * * * *